US011886912B2

(12) United States Patent
Kamat et al.

(10) Patent No.: US 11,886,912 B2
(45) Date of Patent: Jan. 30, 2024

(54) MULTI SUBSTRATE PUBLIC CLOUD BIG DATA JOBS AS A SERVICE

(71) Applicant: Salesforce Inc., San Francisco, CA (US)

(72) Inventors: Amit Martu Kamat, Sammamish, WA (US); Siddharth Sharma, Newark, CA (US); Raveendrnathan Loganathan, Sammamish, WA (US); Anil Raju Puliyeril, Union City, CA (US); Kenneth Siu, Castro Valley, CA (US)

(73) Assignee: Salesforce Inc., San Francisco, CA (US)

(*) Notice: Subject to any disclaimer, the term of this patent is extended or adjusted under 35 U.S.C. 154(b) by 148 days.

(21) Appl. No.: 17/162,675

(22) Filed: Jan. 29, 2021

(65) Prior Publication Data

US 2022/0121488 A1 Apr. 21, 2022

Related U.S. Application Data

(60) Provisional application No. 63/093,671, filed on Oct. 19, 2020.

(51) Int. Cl.
| | | |
|---|---|---|
| *G06F 9/48* | (2006.01) | |
| *G06F 9/50* | (2006.01) | |
| *G06F 9/38* | (2018.01) | |

(52) U.S. Cl.
CPC .......... *G06F 9/4881* (2013.01); *G06F 9/3891* (2013.01); *G06F 9/505* (2013.01)

(58) Field of Classification Search
CPC ....... G06F 9/4881; G06F 9/3891; G06F 9/505
See application file for complete search history.

(56) References Cited

U.S. PATENT DOCUMENTS

| | | | | |
|---|---|---|---|---|
| 8,392,574 | B1* | 3/2013 | Shah | G06F 9/5061 709/225 |
| 9,276,987 | B1* | 3/2016 | Sirota | G06F 9/5033 |
| 10,320,638 | B1* | 6/2019 | Lauinger | H04L 43/0805 |
| 2012/0010754 | A1* | 1/2012 | Matteson | H05K 7/20836 361/679.48 |
| 2015/0370603 | A1* | 12/2015 | Fuller | G06F 9/5011 718/104 |
| 2017/0061143 | A1* | 3/2017 | Rooney | G06F 21/6263 |
| 2017/0269944 | A1* | 9/2017 | Pelissier | H04L 41/0823 |
| 2018/0081704 | A1* | 3/2018 | Hirt | G06F 11/3409 |

(Continued)

*Primary Examiner* — Jorge A Chu Joy-Davila
(74) *Attorney, Agent, or Firm* — Holland & Hart LLP

(57) ABSTRACT

Data processing approaches are disclosed that include receiving a configuration indicating a plurality of parameters for performing a data processing job, identifying available compute resources from a plurality of public cloud infrastructures, where each public cloud infrastructure of the plurality of public cloud infrastructures supports one or more computing applications, one or more job schedulers, and one or more utilization rates, selecting one or more compute clusters from one or more of the plurality of public cloud infrastructures based on a matching process between the parameters for performing the data processing job and a combination of the one or more computing applications, the one or more job schedulers, and the one or more utilization rates, and initiating the one or more compute clusters for processing the data processing job based on the selecting.

19 Claims, 12 Drawing Sheets

(56) References Cited

U.S. PATENT DOCUMENTS

| | | | | |
|---|---|---|---|---|
| 2018/0159727 A1* | 6/2018 | Liu | ............... | G06F 9/45558 |
| 2018/0300174 A1* | 10/2018 | Karanasos | ............ | G06F 9/4881 |
| 2019/0146850 A1* | 5/2019 | Quinn | ............... | G06F 9/5077 |
| | | | | 709/226 |
| 2019/0158367 A1* | 5/2019 | Barooah | ............ | H04L 41/5054 |
| 2019/0171494 A1* | 6/2019 | Nucci | ............... | G06N 5/003 |
| 2019/0340033 A1* | 11/2019 | Ganteaume | ............ | H04L 43/16 |
| 2020/0104170 A1* | 4/2020 | Else | ............... | G06F 9/4887 |
| 2020/0379816 A1* | 12/2020 | Lin | ............... | G06F 9/5072 |

* cited by examiner

MULTI SUBSTRATE PUBLIC CLOUD BIG DATA JOBS AS A SERVICE

CROSS-REFERENCE

The present Application for Patent claims the benefit of U.S. Provisional Patent Application No. 63/093,671 by Kamat et al., entitled "MULTI SUBSTRATE PUBLIC CLOUD BIG DATA JOBS AS A SERVICE," filed Oct. 19, 2020, assigned to the assignee hereof, and expressly incorporated by reference herein.

FIELD OF TECHNOLOGY

The present disclosure relates generally to database systems and data processing, and more specifically to multi substrate public cloud big data jobs as a service.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some examples, the cloud platform may support performing one or more data processing jobs. However, the cloud platform may have specific configurations, requirements, and characteristics that can make determination and assembly of data processing resources difficult. The difficulty increases if a data processing job has access to multiple cloud platforms, as the specific configurations, requirements, and characteristics differ greatly between these different cloud platforms. In addition, because of these differences, management and use of these multiple cloud platforms may become cumbersome, inefficient, and expensive.

DETAILED DESCRIPTION

Figure 1:
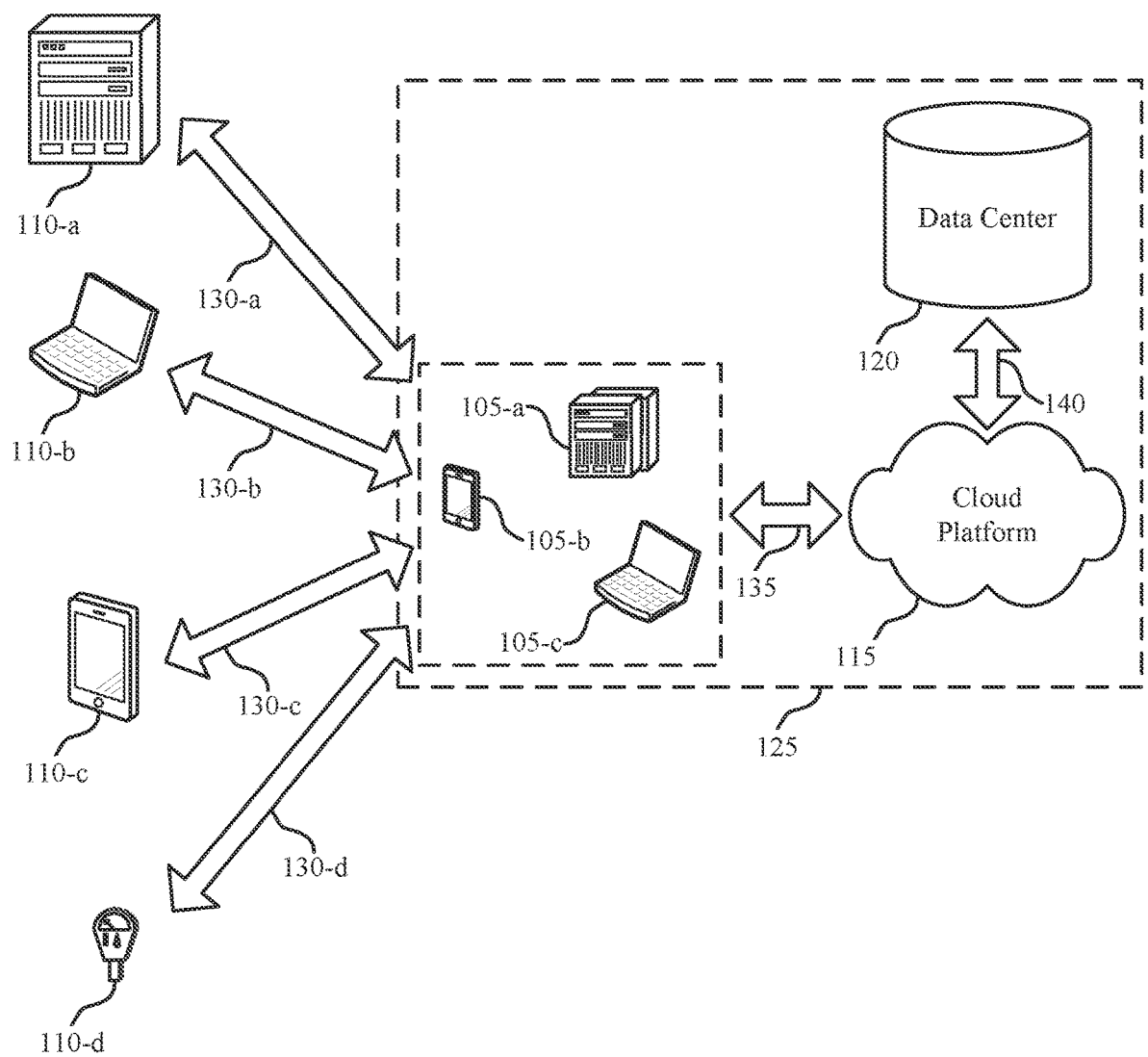
FIG. 1 illustrates an example of a system for data processing that supports multi substrate public cloud big data jobs as a service in accordance with aspects of the present disclosure.

Various cloud platforms may offer services and computation resources for performing data processing jobs. However, these various cloud platforms also have varying capabilities, configurations, and characteristics and support a variety of applications or frameworks. For each data processing job, a framework needs to be provisions, managed, scaled, and deprovisioned in a public cloud infrastructure. However, the capability, performance, and cost structure of public cloud infrastructures is complex. For example, different public cloud infrastructures may support various hardware stock keeping units (SKUs), pricing options such as reserved instance pricing or instantaneous instance pricing, among other variabilities. The differences and complexities between cloud platforms present technical challenges for selecting and provisioning a cloud provider for processing a job because the specific implementations, configurations, and costs may vary widely. As such, determining and assembling the computation resources to meet the goals of the data processing job quickly becomes difficult. In addition, these cloud platforms often have single entry points that submit jobs to large clusters. However, in this scheme the entry points quickly become overloaded and the associated resources may not be scalable.

The subject matter discussed herein allows determination and assembly of various computation resources to more effectively run and optimize various aspects of the data processing job. In some examples, a server or service running on a server may be configured to manage the selection, initiation, maintenance, and termination of a computation resource (e.g., a cluster of servers or workers) from a cloud provider (or combination of cloud providers) based on characteristics or parameters of a data processing job. For example, a configuration that contains parameters for a data processing job may be received at the server. Available computation resources from public cloud infrastructures may be identified by the server. In some examples. these public cloud infrastructures may support a variety of computing applications, job schedulers, and utilization rates, such that many combinations of cloud infrastructure, computing application, job scheduler, and utilization rates are possible. From these available compute resources, one or more compute clusters may be selected based on a matching process between the received parameters and the computing applications, job schedulers, and utilization rates. These selected compute clusters may be initiated based on the selection of the compute clusters. In this way, rules and configurations may be configured at a server and used by the server to determine and assemble computation resources to run the data processing job in a way that meets the configuration and parameters and also resolves the technical challenges present in navigating the various cloud platform's implementations and configurations.

Some examples of the subject matter discussed herein may also include receiving, at the server, availability information from the public cloud infrastructures. Information about utilization rates may also be received at the server. In addition, parameters in the configuration may include a designation of acceptable utilization rates. In some examples, configuration information and an initiation request may be sent to the compute clusters or to a service at a cloud infrastructure responsible for managing compute clusters. In some examples, the location of data to be processed during the data processing job may be obtained, and the selection of the particular compute clusters may be based on the data being stored by a particular public cloud infrastructure.

In some examples, the server that selected and initiated the computation resources for a data processing job may receive metrics from the compute clusters (e.g., performance metrics during the processing of a particular job). Based on these metrics, the server may perform various actions, including scaling operations that adjust the selection of compute clusters being used for the data processing job. In some examples, the configuration or parameters associated with a data processing job may include a designation of a particular operating environment in which the data processing job is to be run (e.g., a production environment or a test or development environment). Some examples also include a designation of an instance family designed to optimize certain resources, and the matching process may include a matching between the parameters for the job and the instance family.

Aspects of the disclosure are initially described in the context of an environment supporting an on-demand database service. Aspects of the disclosure are also described by architecture diagrams of systems and process flow diagrams relating to multi substrate public cloud big data jobs as a service. Aspects of the disclosure are further illustrated by and described with reference to apparatus diagrams, system diagrams, and flowcharts that relate to multi substrate public cloud big data jobs as a service.

FIG. 1 illustrates an example of a system 100 for cloud computing that supports multi substrate public cloud big data jobs as a service in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some examples, the subsystem 125 may be configured to receive a configuration (e.g., a message or file) that contains parameters for a data processing job. The subsystem 125 may also be configured to identify available compute resources from public cloud infrastructures (e.g., resources from data center 120 which may be an example of one or several cloud-based infrastructures). In some examples these public cloud infrastructures may each support one or more computing applications, job schedulers, and utilization rates. In some examples, one or more of the computing applications, job schedulers, or utilization rates may vary over time based on current processing loads or other factors. From these available compute resources, the subsystem 125 may also be configured to select one or more compute clusters based at least in part on a matching process between the received parameters and a combination of computing applications, job schedulers, and utilization rates. These selected compute clusters may be initiated by the subsystem 125 based on the selection of the compute clusters.

In some systems, when a data processing job is run on a cloud platform, the cloud platform requires specific knowledge and information that is particular to the particular implementations present in the cloud platform. It is difficult to switch between cloud platforms, and more difficult to utilize multiple cloud platforms for a data processing job. Furthermore, it is difficult to monitor the various cloud platforms for metrics, utilization rates, and other information. In addition, the resources assigned to the cloud platform are not scalable, and single machines configured as entry points are easily overwhelmed.

The subject matter discussed herein may implement rules and configurations used to determine and assemble compute resources to run a data processing job that provides scalability, flexibility, and compatibility with multiple public cloud infrastructures. Techniques described herein may interface with a variety of public cloud infrastructures and may create multiple clusters to run the job. In this way, the techniques described herein resolves the technical challenges present in navigating the various cloud platform's implementations and configurations. The subject matter discussed herein also provides a centralized gateway for determination, creation, implementation, and monitoring of multiple clusters to run data processing jobs.

It should be appreciated by a person skilled in the art that one or more aspects of the disclosure may be implemented in a system 100 to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In one example, a cloud client 105 may wish to run a data processing job using the cloud platform 115. In such a case, the cloud platform may receive a configuration from the cloud client 105 or other source. This configuration may include various types of information, including acceptable utilization rates, development environment preferences, performance parameters (e.g., latency or reliability thresholds), rules, limitations, or other information pertaining to the data processing job. The cloud platform 115 may identify various compute resources available from one or more public cloud infrastructures. Each of these public cloud infrastructures may support one or more computing applications, job schedulers, and utilization rates, and each public cloud infrastructure may support these in different ways or have different combinations of these factors or possible configurations. The cloud platform 115 may select one or more compute clusters from the one or more public cloud infrastructures to be used for the data processing job. This selection may include a matching process between the parameters included in the configuration received by the cloud platform 115 and the computing applications, job schedulers, and utilization rates. This allows a client 105 to specify certain requirements for the data processing job. The cloud platform 115 may take these requirements into account and select a customized group of compute clusters that meet the requirements provided. The cloud platform 115 may also initiate the compute clusters and begin processing the data processing job, while taking into account the selection of the compute clusters.

Figure 2:
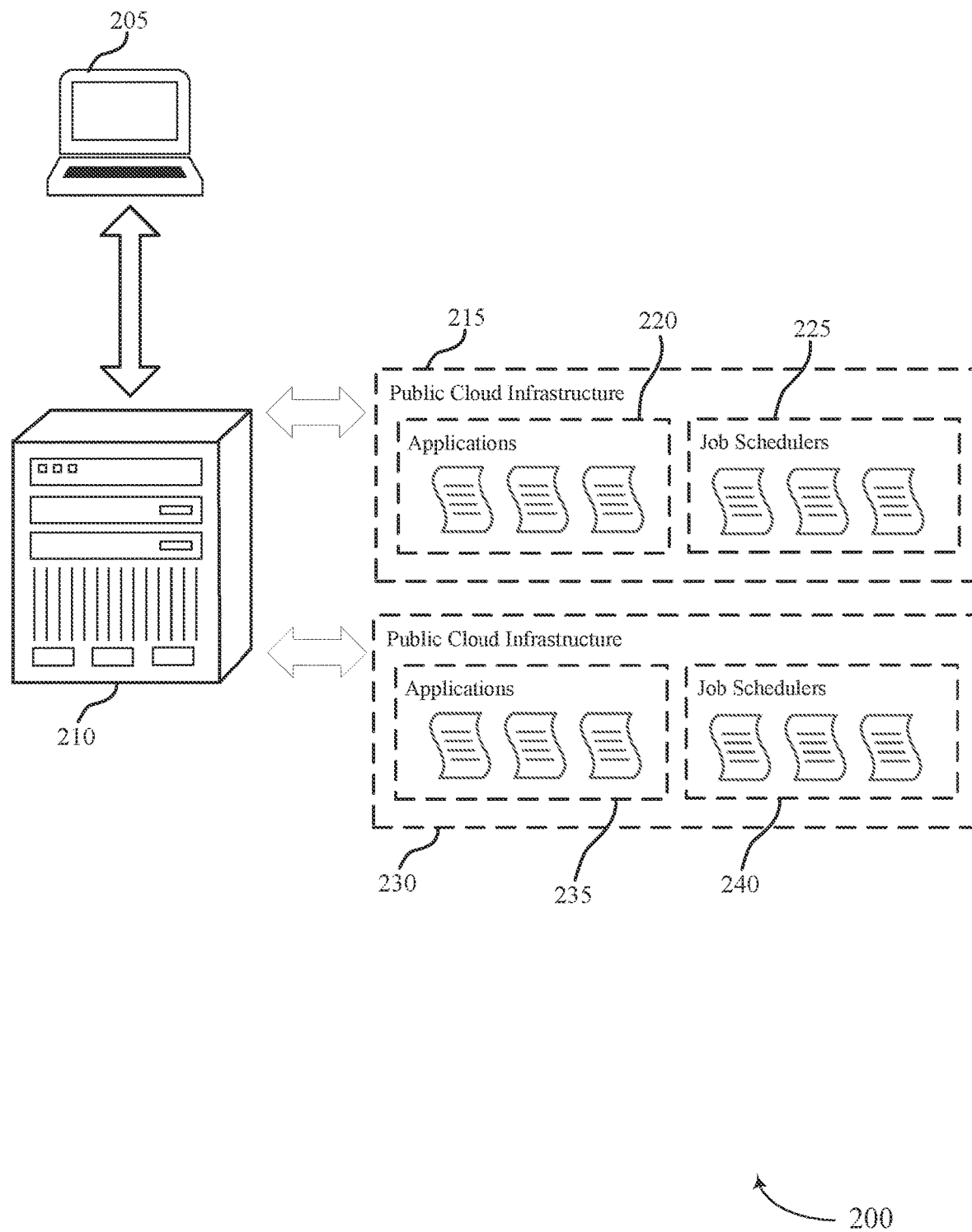
FIG. 2 illustrates an example of an architecture diagram of a system that supports multi substrate public cloud big data jobs as a service in accordance with aspects of the present disclosure.

FIG. 2 illustrates an example of a system 200 that supports multi substrate public cloud big data jobs as a service in accordance with aspects of the present disclosure. The system 200 may include a client 205. The client 205 may be any appropriate device capable of communicating with other devices, such as a laptop computer, mobile device, desktop computer, server, virtual machine, or other device. In some examples, the client 205 is associated with a tenant of a multi-tenant database system. In such examples, a tenant may have a service level agreement (SLA) in place that defines thresholds for latency and resiliency as well as data security and privacy constraints.

The system 200 may include a data processing controller (DPC) 210, which may be an example of a server, an application server, a database server, a service running on a server, or any other similar component as described herein. In some examples, the DPC 210 may support multiple tenants of a multi-tenant database or multi-tenant cloud-based platform. As such, the DPC 210 may implement data security and data isolation techniques across the multiple tenants utilizing the DPC 210 to meet security thresholds (e.g., as defined by a SLA). The DPC 210 may communicate with a first public cloud infrastructure 215 and a second public cloud infrastructure 230. Public cloud infrastructures 215, 230 may be examples of a public cloud provider that provides storage resources or computation resources and associates services for a fee. Though only two public cloud infrastructures are present in FIG. 2, the DPC 210 may communicate with any number of public cloud infrastructures, or it may communicate with a single public cloud infrastructure. In this example, there is a first public cloud infrastructure 215, and a second public cloud infrastructure 230. The first public cloud infrastructure 215 may include one or more applications 220, and one or more job schedulers 225. The second public cloud infrastructure 230 may also include one or more applications 235, and one or more jobs schedulers 240.

The applications 220, 235 may include various applications that may be run on each public cloud infrastructure 215, 230. The applications 220, 235 may include various open source applications or closed source applications and may be used for different aspects of a data processing job. An application may also be referred to as a framework. The individual selection of these applications to enter 220, 230 may change depending on the requirements of the data processing job. Some examples of applications or frameworks that may be used include but are not limited to Spark, Hive, Presto and other applications that may be used in data processing jobs. Various different applications 220, 235 may be used in a single public cloud infrastructure 215, 230 depending on the requirements of the particular data processing job.

The job schedulers 225, 240 that may be responsible for running applications in a certain configuration, implementation, or manner as prescribed by the public cloud infrastructure to which the job schedulers to 225, 240 belong. The job schedulers 225, 240 may be specific to each public cloud infrastructure 215, 230, and may use different configurations, implementations, or manners of running the applications 220, 230 on each public cloud infrastructure 215, 230. The particular job schedulers 225, 240 used may be selected from a number of available job schedulers depending on the requirements of the particular data processing job. In some examples, the job schedulers 225, 240 may also be known as EMR.

The DPC 210 may receive a configuration (e.g., from client 205) related to the data processing job. The configuration may be received as a message or configuration file or any similar format suitable for transmission between the client 205 and the DCP 210. The configuration may include various types of information that will determine the selection of compute resources to be used to process the data processing job. The DPC 210 may be configured with a set of rules, algorithms or similar logic that is configured for selecting and initiating a set of compute resources based on parameters in the received configuration. Selecting a set of compute resources may include automated selection, by the DPC 210, of the hardware (e.g., servers, machines, virtual machines, etc.) used to perform the data processing job. In some examples, the hardware selecting may be based on stock keeping units (SKUs) provided by the cloud infrastructures. The DPC 210 may identify (e.g., based on the configured rules) available compute resources from the first public cloud infrastructure 215, and the second public cloud infrastructure 230. The DPC 210 may also select one or more compute clusters from the first public cloud infrastructure 215 and the second public cloud infrastructure 230. This selection may be based on a matching process between the information received in the configuration and the applications 220, 235 and the job schedulers 225, 240. The DPC 210 may then initiate the selected compute clusters to begin processing the data processing job. In this way, the DPC 210 may follow rules, configurations, or other directives to determine which compute resources, applications 220, 235, and job schedulers 225, 240 to use for the data processing job. As such, techniques described herein support the performance of generic data processing jobs (e.g., a jobs as a service solution) that can consider and select between combinations of public cloud providers and the frameworks or applications running on those providers (e.g., based on performance or cost optimization based on submitted job parameters), while supporting automated hardware selection, automated resource scaling, and automated node recovery.

Figure 3:
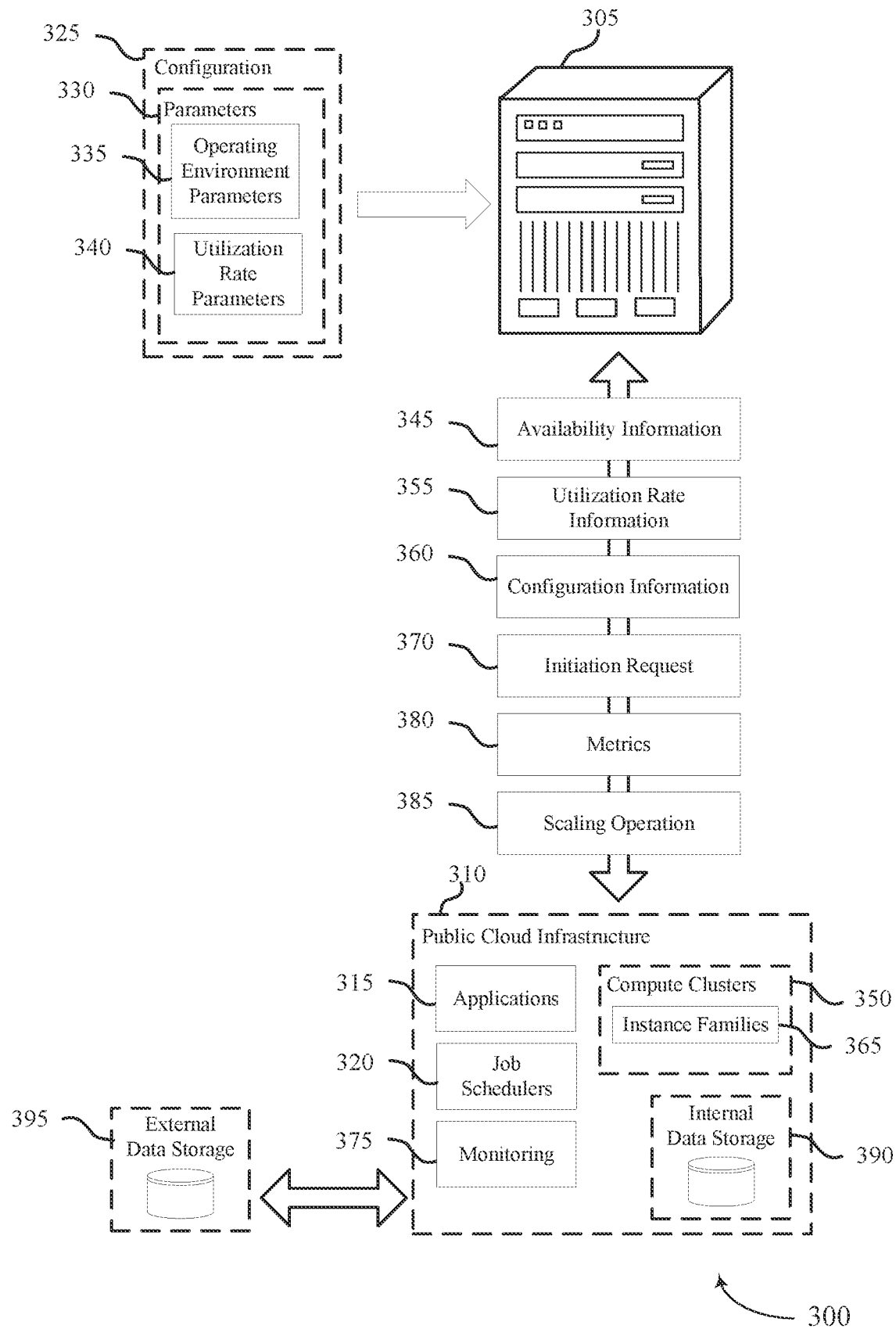
FIG. 3 illustrates an example of an architecture diagram of a system that supports multi substrate public cloud big data jobs as a service in accordance with aspects of the present disclosure.

FIG. 3 illustrates an example of a system 300 that supports multi substrate public cloud big data jobs as a service in accordance with aspects of the present disclosure. The system 300 may include a data processing controller (DPC) 305, which may be an example of DCP 205 or a server as described with reference to FIG. 2. The DPC 305 is responsible for coordinating the use of one or more public cloud infrastructures to run a data processing job. In this example, only one public cloud infrastructure 310 is shown. However, the system 300 may communicate with any number of public cloud infrastructures and is not limited to this particular example. Similar to the example discussed in FIG. 2, the public cloud infrastructure 310 may include applications 315 and job schedulers 320. The applications 315 and job schedulers 320 may operate similarly to those discussed in FIG. 2.

The DPC 305 may receive a configuration 325. The configuration 325 may include one or more parameters 330 for running the data processing job. The parameters may include operating environment parameters 335 and utilization rate parameters 340. The operating environment parameters 335 may include a designation of a particular operating environment in which the data processing job is to be run. For example, one operating environment may be a development environment, in which latency and error tolerances are higher. In other examples, the operating environment may be a production environment in which latency and error tolerances are lower as compared to a development environment.

The utilization rate parameters 340 may include a designation of an acceptable range of utilization rates for the data processing job. For example, if a client has an upper limit for utilization rates that should not be passed while processing the data processing job, this requirement may be stated in the utilization rate parameters 340. Thus, the DPC 305 may configure the particular resources in the public cloud infrastructure 310 such that any utilization rates related to the data processing job are kept within the requirements defined in the utilization rate parameters 340.

The DPC 305 may identify compute resources that are available within the public cloud infrastructure 310. In some examples, the DPC 305 may receive availability information 345 from the public cloud infrastructure 310. The availability information 345 may include information about the available compute resources within the public cloud infrastructure 310 at a given time or a projected availability for a given time window. The availability information 345 may also include information about other resources available within the public cloud infrastructure 310 that may be used to process the data processing job. In some examples, the availability information 345 may include real-time information about resources from the public about infrastructure 310. The availability information 345 may be used by the DPC 305 to determine and assemble compute resources to process the data processing job.

In some examples, the DPC 305 may receive utilization rate information 355 from the public cloud infrastructure 310. The utilization rate information 355 may include information about utilization rates related to the job schedulers 320 of the public cloud infrastructure 310. In some examples, the utilization rate information 355 may include information that utilization rates related to other elements of the public cloud infrastructure 310. The utilization rate information 355 may be used by the DPC 305 to determine and assemble compute resources to process the data processing job.

In some examples, the resources available in the public cloud infrastructure 310 include one or more compute clusters 350. The compute clusters 350 may be examples of or include a set of or any portion of hardware, workers, servers, virtual machines, bare metal machines, or any similar computational resource that provides the computing power to process the data processing job. The DPC 305 may select one or more of these compute clusters 350 from the public cloud infrastructure 310 based on a matching process between the parameters 330 received in the configuration 325 and the applications 315, the job schedulers 320, and utilization rates associated with the job schedulers 320. In this way, the DPC 305 may select appropriate resources to be used to meet the requirements of the data processing job. In some examples, this matching process may include rules defined at the DPC 305 or elsewhere (e.g., at a client). These rules may provide weights for each of the parameters 330 defined in the configuration 325. The rules may also provide weights for other parameters defined elsewhere. The rules or weights may be defined at the DPC 305 and may be applied the same to all tenants or users that submit data processing jobs to the DPC 305, or the DPC 305 may be configured with different sets of rules, configurations, or weights for different tenants or users. The DPC 305 may use these weights as it determines and assembles available computer resources for processing the data processing job. For example, if the configuration 325 indicates a latency target and an error target, and if latency is more heavily weighted in the rules than the error rate, then the DPC 305 may select a combination of public cloud infrastructure 310, application 315, and job scheduler 320 that can perform the data processing job and return the results within the latency target, even at the expense of potentially increased error. The selection or weighting may also consider the cost of performing a particular data processing job (e.g., based on reserved instance pricing of resource or instantaneous instance (e.g., SPOT instance) pricing of resources, and the DPC 305 may optimize the configuration or selection of a job to optimize for cost.

In some environments, the DPC 305 may send configuration information 360 to the compute clusters 350 of the public cloud infrastructure 310. The configuration information 360 may include information about applications 315 and job schedulers 320 associated with the compute clusters 350. In some examples, the configuration information 360 may also include information about various instance families 365 to which the compute clusters 350 may belong. These instance families 365 may define certain optimization priorities for the compute clusters 350. For example, an optimization priority may prioritize computation power, whereas another optimization priority may prioritize memory performance. Other optimization priorities and instance families may prioritize other aspects of the performance of the compute clusters 350. In addition, the configuration information 360 may also include other information relevant to the data processing job required or used by the applications 315, the job schedulers 320, or other elements of the public cloud infrastructure 310.

In some examples, the DPC 305 may send an initiation request 370 to the compute clusters 350. This initiation request 370 may be sent after sending configuration information 360 to the compute clusters 350, or it may be sent at another time.

In some examples, the public cloud infrastructure 310 may include one or more monitoring elements 375 that monitor various aspects of the public cloud infrastructure 310. For example, the monitoring element 375 may monitor the compute clusters 350 and collect information about their performance. In other examples, the monitoring element 375 may monitor other elements or aspects of the public cloud infrastructure 310. The monitoring element 375 may assemble the collected information into metrics 380 that may be sent to the DPC 305. The DPC 305 may then use these metrics 380 to determine, assemble, or modify compute resources to process the data processing job. In some examples, the monitoring elements 375 may support automated detection of node failures and automated recover of jobs by the DPC 305.

The DPC 305 may use the metrics 380 as a factor in performing a scaling operation 385 on the compute clusters 350. The scaling operation 385 may select additional compute clusters 350 to process the data processing job and initiate these additional compute clusters 350. The scaling operation 385 may also determine that certain compute clusters 350 of those compute clusters 350 being used to process the data processing job should be terminated and may terminate those compute clusters 350. As such, the DPC 305 may support automated scaling of resources based on job complexity and real-time metrics associated with job performance.

The public cloud infrastructure 310 may also include internal data storage 390. The internal data storage 390 may store data to be processed during the data processing job. The internal data storage 390 may also store the data produced as a result of the data processing job. In some examples, the DPC 305 may identify that data to be processed by the data processing job is stored in a particular public cloud infrastructure 310. In such a case, the DPC 305 may take this identification into account when selecting the particular compute clusters 350 or other resources to be used during the data processing job. For example, if data to be processed by the data processing job is stored in an internal data storage 390 of a public cloud infrastructure 310, the DPC 305 may be more likely to use resources from the same public loud infrastructure 310 that contains the internal data storage 390 where the data to be processed is stored. As such, the data stored in one public cloud infrastructure may not need to be transferred over to another public cloud infrastructure for processing, which may reduce system traffic and compute times. This may be accomplished by the DPC 305 adjusting rules, weights, or other factors that it uses when determining and assembling resources to be used to process the data processing job. In other examples, data may be stored on external data storage 395. The external data storage 395 may be related with a different public cloud infrastructure, may be local storage to a client, or may be located elsewhere. In some examples, the location of the external data storage 395 may also be a factor taking into account by the DPC 305 when determining and assembling resources to be used to process the data processing job.

Figure 4:
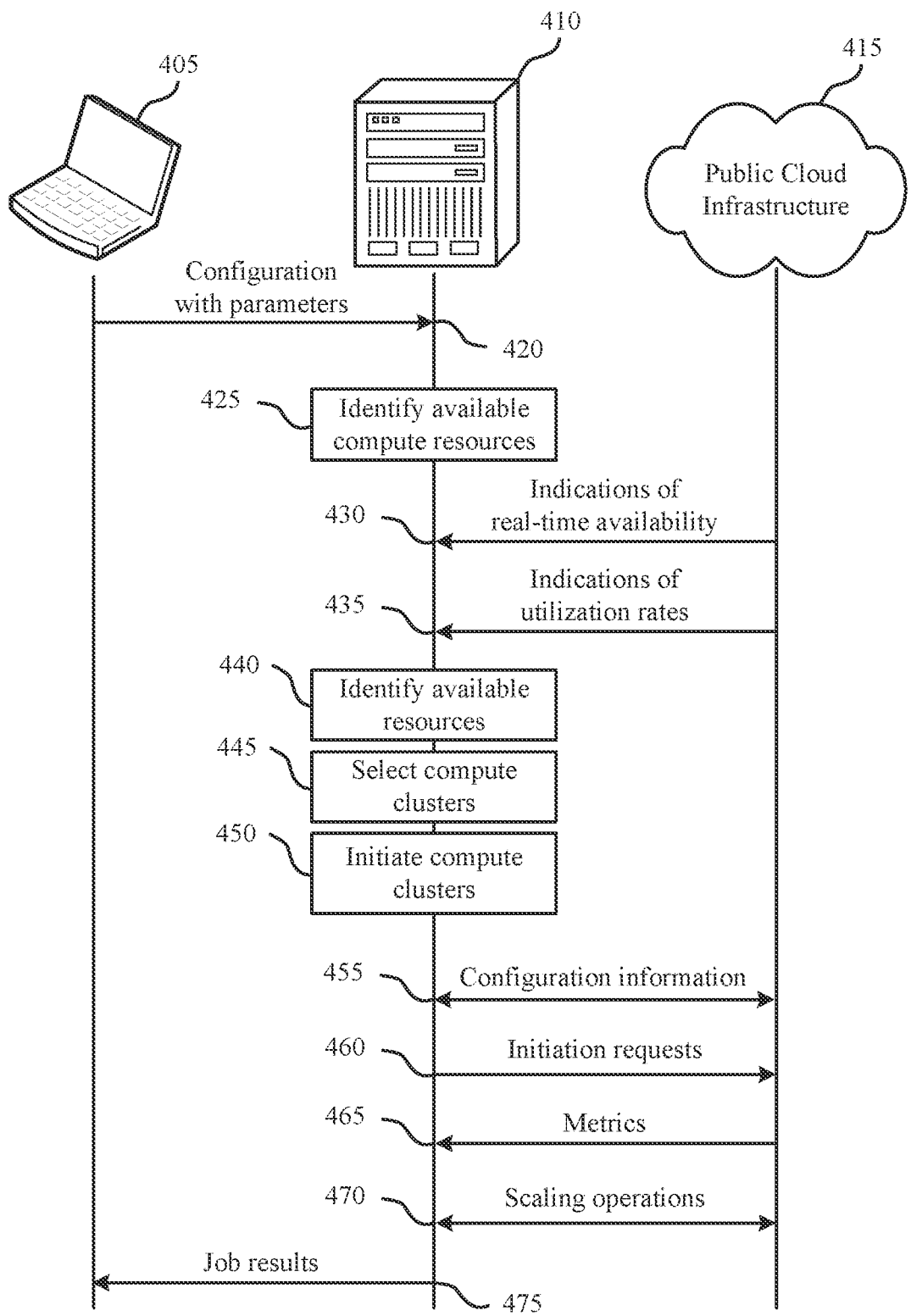
FIG. 4 illustrates an example of a process flow that supports multi substrate public cloud big data jobs as a service in accordance with aspects of the present disclosure.

FIG. 4 illustrates an example of a process flow 400 that supports multi substrate public cloud big data jobs as a service in accordance with aspects of the present disclosure. The process flow 400 may include a client 405, a data processing controller (DPC) 410, and a public cloud infrastructure 415. The client 405, DPC 410, and public cloud infrastructure 415 may be examples of corresponding clients, DPCs, and public cloud infrastructure components described with reference to FIGS. 1-3. Even though FIG. 4 shows only a single public cloud infrastructure 415, the process flow 400 may support any number of public cloud infrastructures. The single public cloud infrastructure shown in FIG. 4 may represent a single public cloud infrastructure or multiple public cloud infrastructures.

At 420, the DPC 410 may receive a configuration indicating a plurality of parameters for performing a data processing job. As described with reference to FIG. 3, the configuration may include parameters for running the data processing job, including operating environment parameters, utilization rate parameters, performance thresholds, memory restrictions, data size parameters, etc. These and other parameters may be used by the DPC 410 to determine and assemble the resources for processing the data processing job.

At 425, the DPC 410 may identify available compute resources from a plurality of public cloud infrastructures 415, wherein each public cloud infrastructure 415 of the plurality of public cloud infrastructures 415 supports one or more computing applications, one or more job schedulers, and one or more utilization rates associated with the one or more job schedulers. As described with reference to FIGS. 2 and 3, the DPC 410 may identify available resources from the one or more public cloud infrastructures that are used to run the data processing job. These resources may include compute clusters 350, applications 220, 230, 315, job schedulers 225, 240, 320, or other resources available for running the data processing job.

At 430, the DPC 410 may receive one or more indications of real-time availability from the plurality of public cloud infrastructures 415. As described with reference to FIG. 3, each public cloud infrastructure 415 may have a varying level of availability of its resources that can change over time. By receiving this real-time information, the DPC 410 may better determine and assemble the resources used to process the data processing job, since it can take these changes in availability into account.

At 435, the DPC 410 may receive one or more indications of utilization rates from the plurality of public cloud infrastructures 415. As described with reference to FIG. 3, each public cloud infrastructure 415 may include job schedulers 320 that may each have related utilization rates. The utilization rates may represent the cost of utilizing resources of the public cloud infrastructure 415, such as a reserved instance pricing, an instantaneous instance pricing, or other pricing schemes that the DPC 410 can take into account when selecting the cloud platform, application, and schedule to choose for a data processing job. The DPC 410 may take the utilization rates into consideration when determining which compute resources to use to process the data processing job.

At 440, the DPC 410 may identify available compute resources from a plurality of public cloud infrastructures, wherein each public cloud infrastructure of the plurality of public cloud infrastructures supports one or more computing applications, one or more job schedulers, and one or more utilization rates associated with the one or more job schedulers. Additionally, the DPC 410 may identify the resources available for the data processing job, and may take into account the indications of real-time availability, as well as the indication of utilization rates. These resources may include compute resources or may include other types of resources for processing the data processing job.

At 445, the DPC 410 may select one or more compute clusters from one or more of the plurality of public cloud infrastructures 415 based at least in part on a matching process between the parameters for performing the data processing job and a combination of the one or more computing applications, the one or more job schedulers, and the one or more utilization rates associated with the one or more job schedulers. As described with reference to FIGS. 2 and 3, the DPC 410 selects the compute clusters by matching up the requirements with the applications, job schedulers, and utilization rates. In some examples, the matching process comprises one or more rules configured at the application server, the one or more rules defining weights for each of the plurality of parameters for performing the data processing job. As described in reference to FIG. 3, these rules and weights allow the DPC 410 to give more or less weight to certain elements of the various public cloud infrastructures 415 to determine and assemble the resources for the data processing job.

At 450, the DPC 410 may initiate the one or more compute clusters (e.g., servers, workers, hardware SKUs, etc.) for processing the data processing job based at least in part on the selecting. As described with reference to FIGS. 2 and 3, the DPC 410 then initiates the compute clusters that were selected based on the matching process. In this way, the DPC 410 initiates the particular compute clusters that will best meet the requirements for the data processing job and efficiently use the resources of the public cloud infrastructure 410.

At 455, the DPC 410 may send configuration information to each of the selected one or more compute clusters, wherein the configuration information is based on one or more computing applications and one or more job schedulers associated with each of the selected one or more compute clusters. As described with reference to FIGS. 2 and 3, various public cloud infrastructures 415 have different implementations, configurations, and designs, which may also include different applications, job schedulers, and utilization rates. The DPC 410 sends configuration information to properly configure the various implementations, configuration, designs, applications, job schedulers, and utilization rates of the public cloud infrastructures 415 to most efficiently and effectively utilize the available resources (e.g., based on the parameters, thresholds, or requirements indicated in the configuration sent from the client 405). In some examples, the public cloud infrastructure 415 may also send configuration information to the DPC 410. This configuration information may include information about the particular configuration or configurations used by the particular public cloud infrastructure 415.

At 460, the DPC 410 may send an initiation request to the selected one or more compute clusters. As described with reference to FIG. 3, the DPC may send the actual request to initiate the clusters and begin the data processing job once they have been selected according to the approaches described herein.

At 465, the DPC 410 may receive one or more metrics from the one or more initiated compute clusters. As described with reference to FIG. 3, the public cloud infrastructure 415 may collect information about the compute clusters or other elements of the public cloud infrastructure 415, and metrics may be assembled from this information. These metrics may then be sent to the DPC 410 so that the DPC 410 may effectively monitor the operation of the compute clusters or other elements of the public cloud infrastructure, and make changes to the compute clusters, configurations, or other elements related to the data processing job.

At 470, the DPC 410 may perform a scaling operation (e.g., automatic scaling) for the initiated one or more compute clusters based on the one or more metrics. In some examples, the scaling operation comprises selecting one or more additional compute clusters from one or more of the plurality of public cloud infrastructures 415 based on the one or more metrics, and initiating the one or more additional compute clusters for processing the data processing job. As described with reference to FIG. 3, the DPC 410 may scale the compute clusters to increase the capability of the compute clusters to meet additional demands or requirements for the data processing job. These changes may be based on metrics received from the initiated compute clusters.

In some examples, the scaling operation comprises selecting one or more of the compute clusters to be terminated based on one or more of the metrics and terminating the one or more compute clusters selected to be terminated. As described with reference to FIG. 3, there may be a need to terminate certain compute clusters. For example, certain clusters may not be performing as required, or perhaps the data processing job needs less resources than those initially provisioned. As a result, the DPC 410 may scale down the compute clusters.

At 475, the DPC 410 may send results from the data processing job to the client 405. In some examples, the DPC 410 may collect all results from the data processing job before sending, or it may send results as they are received.

In some examples, the DPC 410 sends the results of the data processing job to a data storage location distinct from the client 405.

Figure 5:
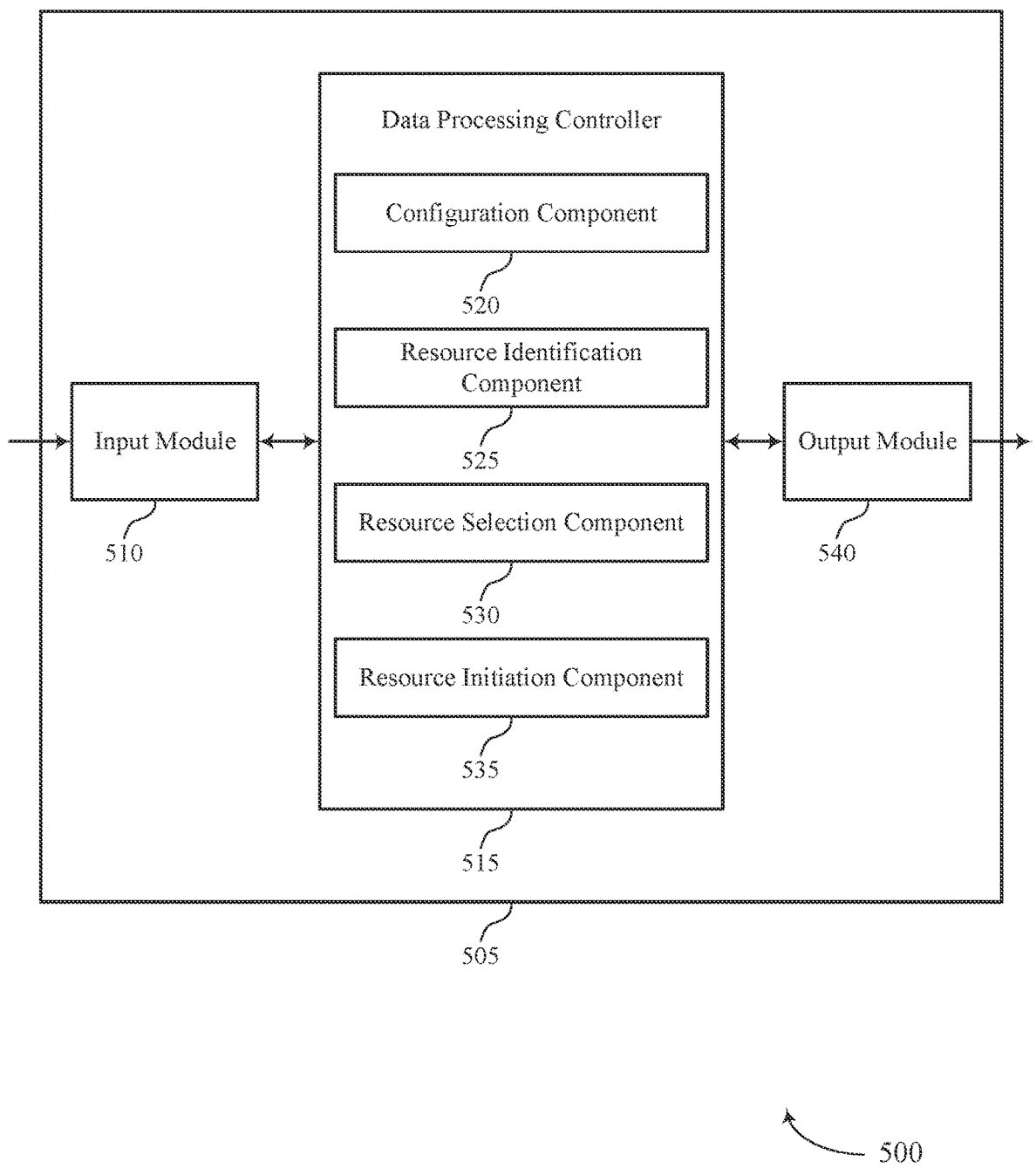
FIG. 5 shows a block diagram of an apparatus that supports multi substrate public cloud big data jobs as a service in accordance with aspects of the present disclosure.

FIG. 5 shows a block diagram 500 of an apparatus 505 that supports multi substrate public cloud big data jobs as a service in accordance with aspects of the present disclosure. The apparatus 505 may be an example of a server as described herein and may include an input module 510, a data processing controller 515, and an output module 540. The apparatus 505 may also include a processor. Each of these components may be in communication with one another (e.g., via one or more buses). In some cases, the apparatus 505 may be an example of a user terminal, a database server, or a system containing multiple computing devices.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the data retention module 515 to support data retention handling for data object stores. In some cases, the input module 510 may be a component of an input/output (I/O) controller 715 as described with reference to FIG. 7.

The data processing controller 515 may include a configuration component 520, a resource identification component 525, a resource selection component 530, and a resource initiation component 535. The data processing controller 515 may be an example of aspects of the data processing controller 605 or 710 described with reference to FIGS. 6 and 7.

The data processing controller 515 and/or at least some of its various sub-components may be implemented in hardware, software executed by a processor, firmware, or any combination thereof. If implemented in software executed by a processor, the functions of the data processing controller 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The data processing controller 515 and/or at least some of its various sub-components may be physically located at various positions, including being distributed such that portions of functions are implemented at different physical locations by one or more physical devices. In some examples, the data processing controller 515 and/or at least some of its various sub-components may be a separate and distinct component in accordance with various aspects of the present disclosure. In other examples, the data processing controller 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The configuration component 520 may receive a configuration indicating a set of parameters for performing a data processing job. The resource identification component 525 may identify available compute resources from a set of public cloud infrastructures, where each public cloud infrastructure of the set of public cloud infrastructures supports one or more computing applications, one or more job schedulers, and one or more utilization rates associated with the one or more job schedulers.

The resource selection component 530 may select one or more compute clusters from one or more of the set of public cloud infrastructures based on a matching process between the parameters for performing the data processing job and a combination of the one or more computing applications, the one or more job schedulers, and the one or more utilization rates associated with the one or more job schedulers. The resource initiation component 535 may initiate the one or more compute clusters for processing the data processing job based on the selecting.

The output module 540 may manage output signals for the apparatus 505. For example, the output module 540 may receive signals from other components of the apparatus 505, such as the data retention module 515, and may transmit these signals to other components or devices. In some specific examples, the output module 540 may transmit output signals for display in a user interface, for storage in a database or data store, for further processing at a server or server cluster, or for any other processes at any number of devices or systems. In some cases, the output module 540 may be a component of an I/O controller 715 as described with reference to FIG. 7.

Figure 6:
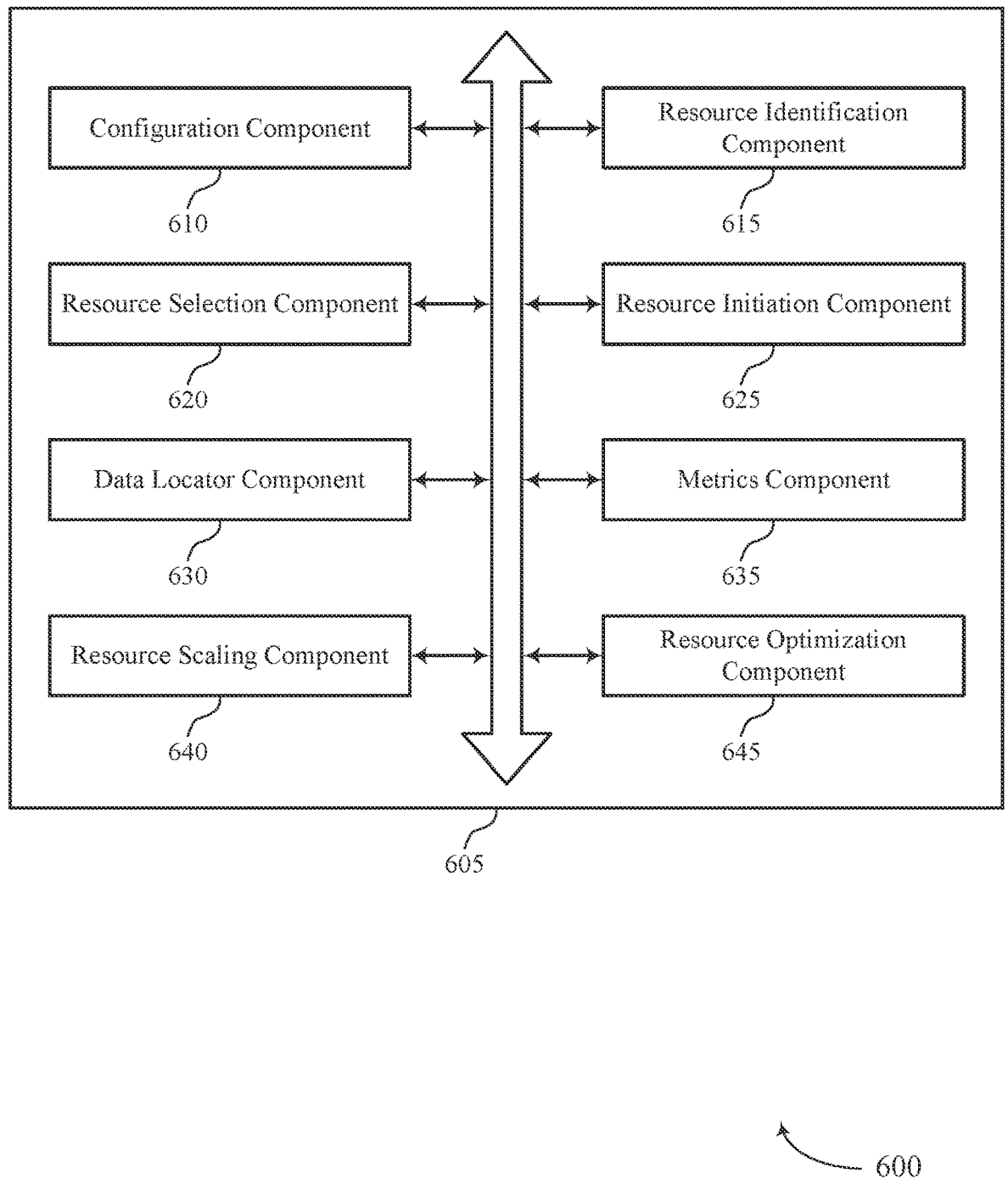
FIG. 6 shows a block diagram of a data processing controller that supports multi substrate public cloud big data jobs as a service in accordance with aspects of the present disclosure.

FIG. 6 shows a block diagram 600 of a data processing controller 605 that supports multi substrate public cloud big data jobs as a service in accordance with aspects of the present disclosure. The data processing controller 605 may be an example of aspects of a data processing controller 515 or a data processing controller 710 described herein. The data processing controller 605 may include a configuration component 610, a resource identification component 615, a resource selection component 620, a resource initiation component 625, a data locator component 630, a metrics component 635, a resource scaling component 640, and a resource optimization component 645. Each of these modules may communicate, directly or indirectly, with one another (e.g., via one or more buses).

The configuration component 610 may receive a configuration indicating a set of parameters for performing a data processing job. In some cases, the parameters for performing the data processing job include a selection of an operating environment. In some cases, the operating environment is a development environment. In some cases, the operating environment is a production environment. In some cases, the parameters for performing the data processing job include a designation of one or more acceptable utilization rates.

The resource identification component 615 may identify available compute resources from a set of public cloud infrastructures, where each public cloud infrastructure of the set of public cloud infrastructures supports one or more computing applications, one or more job schedulers, and one or more utilization rates associated with the one or more job schedulers.

In some examples, the resource identification component 615 may receive one or more indications of real-time availability from the set of public cloud infrastructures. In some examples, the resource identification component 615 may receive one or more indications of utilization rates from the set of public cloud infrastructures.

The resource selection component 620 may select one or more compute clusters from one or more of the set of public cloud infrastructures based on a matching process between the parameters for performing the data processing job and a combination of the one or more computing applications, the one or more job schedulers, and the one or more utilization rates associated with the one or more job schedulers. In some examples, the resource selection component 620 may select one or more of the compute clusters to be terminated based on one or more of the metrics. In some cases, the matching process includes one or more rules configured at the application server, the one or more rules defining weights for each of the set of parameters for performing the data processing job.

The resource initiation component 625 may initiate the one or more compute clusters for processing the data processing job based on the selecting. In some examples, the resource initiation component 625 may send configuration information to each of the selected one or more compute clusters, where the configuration information is based on one or more computing applications and one or more job schedulers associated with each of the selected one or more compute clusters. In some examples, the resource initiation component 625 may send an initiation request to the selected one or more compute clusters. In some examples, the resource initiation component 625 may initiate the one or more additional compute clusters for processing the data processing job. In some examples, the resource initiation component 625 may terminate the one or more compute clusters selected to be terminated.

The data locator component 630 may identify that data to be processed by the data processing job is stored by a first public cloud infrastructure of the set of public cloud infrastructures, where the selecting the one or more compute clusters is further based on the data to be processed being stored by the first public cloud infrastructure.

The metrics component 635 may receive one or more metrics from the one or more initiated compute clusters. The resource scaling component 640 may perform a scaling operation for the initiated one or more compute clusters based on the one or more metrics, where the scaling operation includes. In some examples, the resource scaling component 640 may select one or more additional compute clusters from one or more of the set of public cloud infrastructures based on the one or more metrics.

The resource optimization component 645 may optimize the resources utilized by the data processing controller 605. In some cases, each public cloud infrastructure of the set of public cloud infrastructures supports one or more instance families that define a resource optimization scheme. In some cases, the matching process includes a matching between the parameters for performing the data processing job and the one or more instance families. In some cases, the resource optimization scheme optimizes the computation performance of at least one of the one or more compute clusters. In some cases, the resource optimization scheme optimizes the memory performance of at least one of the one or more compute clusters.

Figure 7:
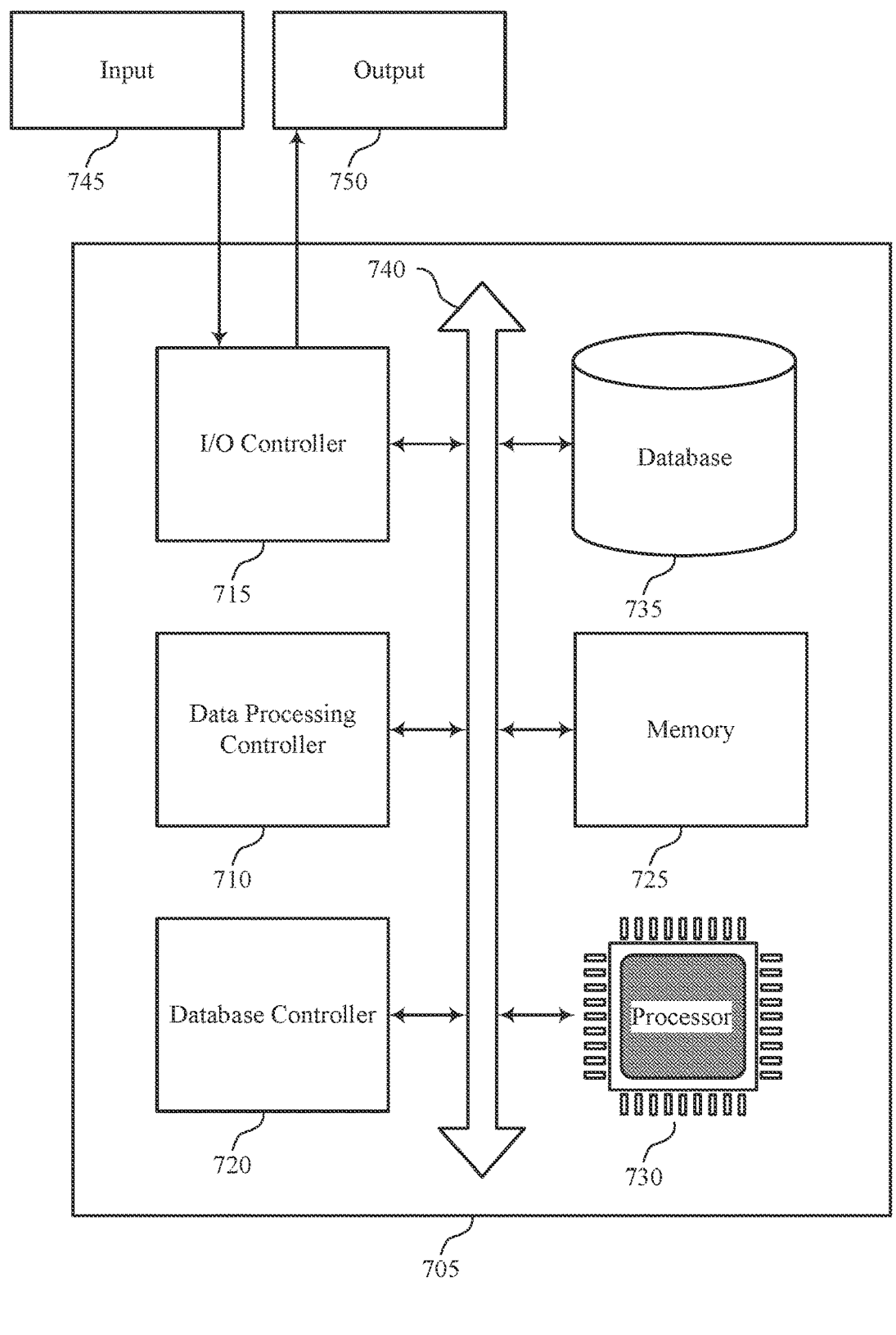
FIG. 7 shows a diagram of a system including a device that supports multi substrate public cloud big data jobs as a service in accordance with aspects of the present disclosure.

FIG. 7 shows a diagram of a system 700 including a device 705 that supports multi substrate public cloud big data jobs as a service in accordance with aspects of the present disclosure. The device 705 may be an example of or include the components of an application server or an apparatus 505 as described herein. The device 705 may include components for bi-directional data communications including components for transmitting and receiving communications, including a data processing controller 710, an I/O controller 715, a database controller 720, memory 725, a processor 730, and a database 735. These components may be in electronic communication via one or more buses (e.g., bus 740).

The data processing controller 710 may be an example of a data processing controller 515 or 605 as described herein. For example, the data processing controller 710 may perform any of the methods or processes described herein with reference to FIGS. 5 and 6. In some cases, the data processing controller 710 may be implemented in hardware, software executed by a processor, firmware, or any combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting multi substrate public cloud big data jobs as a service).

Figure 8:
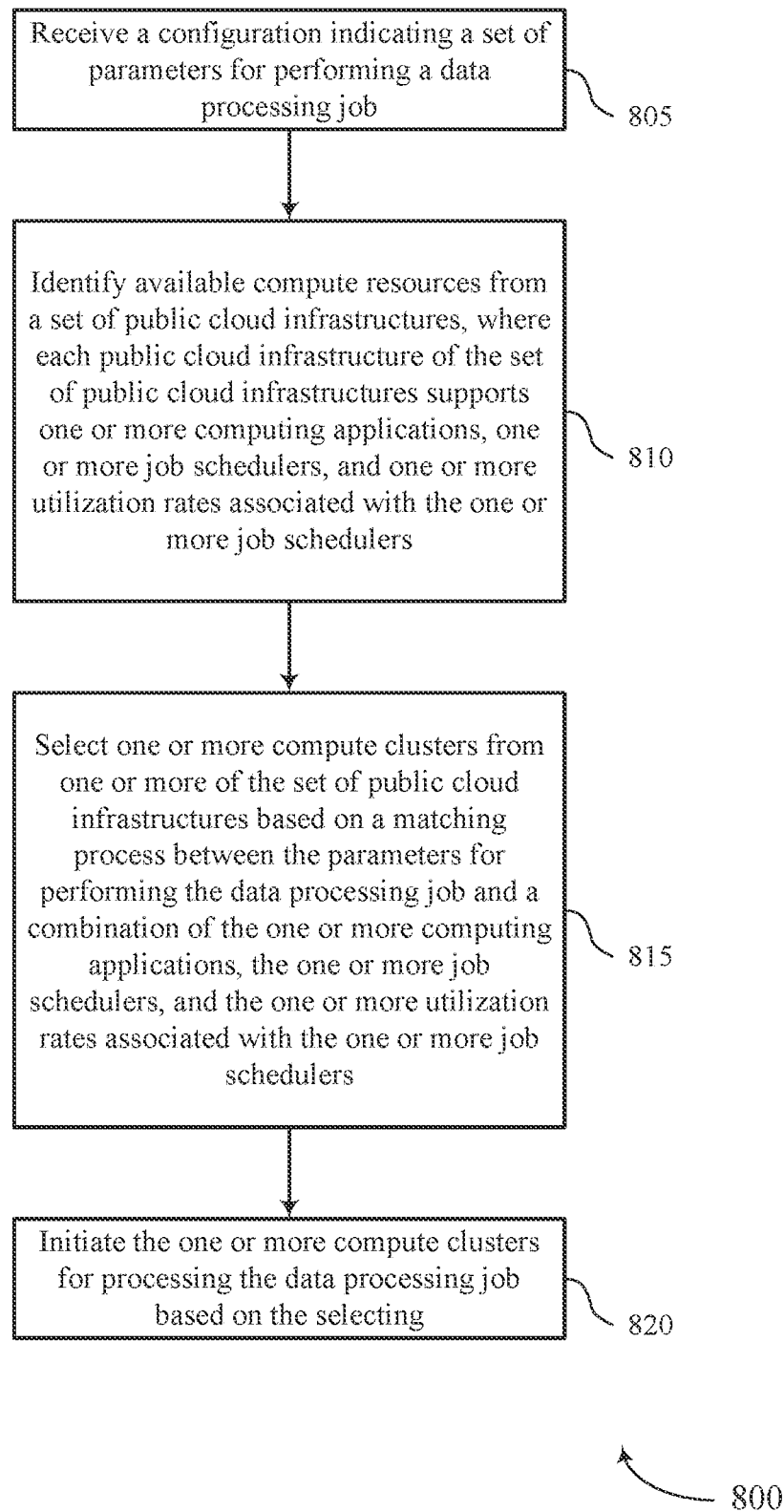
FIGS. 8 through 12 show flowcharts illustrating methods that support multi substrate public cloud big data jobs as a service in accordance with aspects of the present disclosure.

FIG. 8 shows a flowchart illustrating a method 800 that supports multi substrate public cloud big data jobs as a service in accordance with aspects of the present disclosure. The operations of method 800 may be implemented by a application server or its components as described herein. For example, the operations of method 800 may be performed by a data processing controller as described with reference to FIGS. 5 through 7. In some examples, a application server may execute a set of instructions to control the functional elements of the application server to perform the functions described herein. Additionally or alternatively, a application server may perform aspects of the functions described herein using special-purpose hardware.

At 805, the application server may receive a configuration indicating a set of parameters for performing a data processing job. The operations of 805 may be performed according to the methods described herein. In some examples, aspects of the operations of 805 may be performed by a configuration component as described with reference to FIGS. 5 through 7.

At 810, the application server may identify available compute resources from a set of public cloud infrastructures, where each public cloud infrastructure of the set of public cloud infrastructures supports one or more computing applications, one or more job schedulers, and one or more utilization rates associated with the one or more job schedulers. The operations of 810 may be performed according to the methods described herein. In some examples, aspects of the operations of 810 may be performed by a resource identification component as described with reference to FIGS. 5 through 7.

At 815, the application server may select one or more compute clusters from one or more of the set of public cloud infrastructures based on a matching process between the parameters for performing the data processing job and a combination of the one or more computing applications, the one or more job schedulers, and the one or more utilization rates associated with the one or more job schedulers. The operations of 815 may be performed according to the methods described herein. In some examples, aspects of the operations of 815 may be performed by a resource selection component as described with reference to FIGS. 5 through 7.

At 820, the application server may initiate the one or more compute clusters for processing the data processing job based on the selecting. The operations of 820 may be performed according to the methods described herein. In some examples, aspects of the operations of 820 may be performed by a resource initiation component as described with reference to FIGS. 5 through 7.

Figure 9:
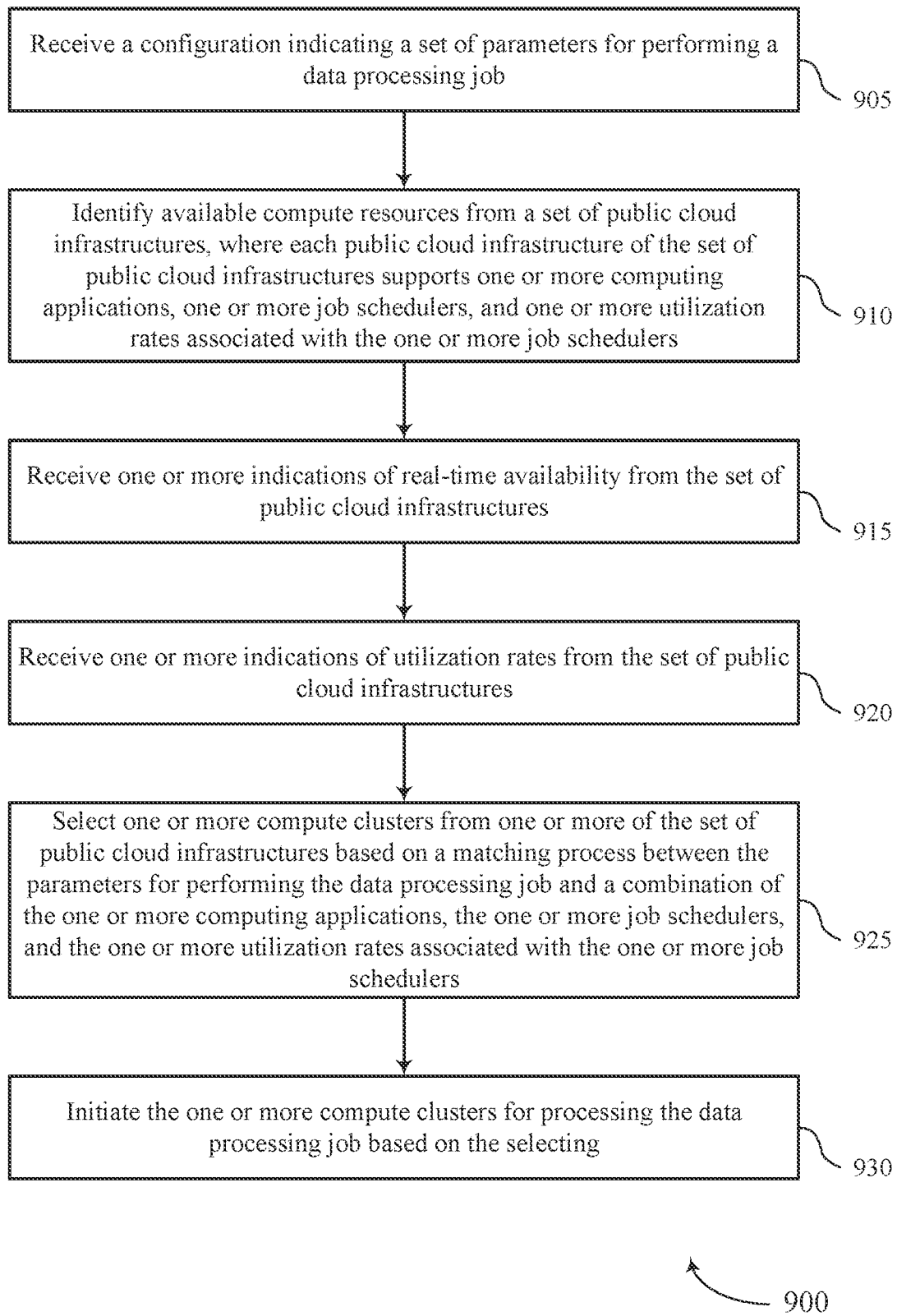

FIG. 9 shows a flowchart illustrating a method 900 that supports multi substrate public cloud big data jobs as a service in accordance with aspects of the present disclosure. The operations of method 900 may be implemented by an application server or its components as described herein. For example, the operations of method 900 may be performed by a data processing controller as described with reference to FIGS. 5 through 7. In some examples, an application server may execute a set of instructions to control the functional elements of the application server to perform the functions described herein. Additionally or alternatively, an application server may perform aspects of the functions described herein using special-purpose hardware.

At 905, the application server may receive a configuration indicating a set of parameters for performing a data processing job. The operations of 905 may be performed according to the methods described herein. In some examples, aspects of the operations of 905 may be performed by a configuration component as described with reference to FIGS. 5 through 7.

At 910, the application server may identify available compute resources from a set of public cloud infrastructures, where each public cloud infrastructure of the set of public cloud infrastructures supports one or more computing applications, one or more job schedulers, and one or more utilization rates associated with the one or more job schedulers. The operations of 910 may be performed according to the methods described herein. In some examples, aspects of the operations of 910 may be performed by a resource identification component as described with reference to FIGS. 5 through 7.

At 915, the application server may receive one or more indications of real-time availability from the set of public cloud infrastructures. The operations of 915 may be performed according to the methods described herein. In some examples, aspects of the operations of 915 may be performed by a resource identification component as described with reference to FIGS. 5 through 7.

At 920, the application server may receive one or more indications of utilization rates from the set of public cloud infrastructures. The operations of 920 may be performed according to the methods described herein. In some examples, aspects of the operations of 920 may be performed by a resource identification component as described with reference to FIGS. 5 through 7.

At 925, the application server may select one or more compute clusters from one or more of the set of public cloud infrastructures based on a matching process between the parameters for performing the data processing job and a combination of the one or more computing applications, the one or more job schedulers, and the one or more utilization rates associated with the one or more job schedulers. The operations of 925 may be performed according to the methods described herein. In some examples, aspects of the operations of 925 may be performed by a resource selection component as described with reference to FIGS. 5 through 7.

At 930, the application server may initiate the one or more compute clusters for processing the data processing job based on the selecting. The operations of 930 may be performed according to the methods described herein. In some examples, aspects of the operations of 930 may be performed by a resource initiation component as described with reference to FIGS. 5 through 7.

Figure 10:
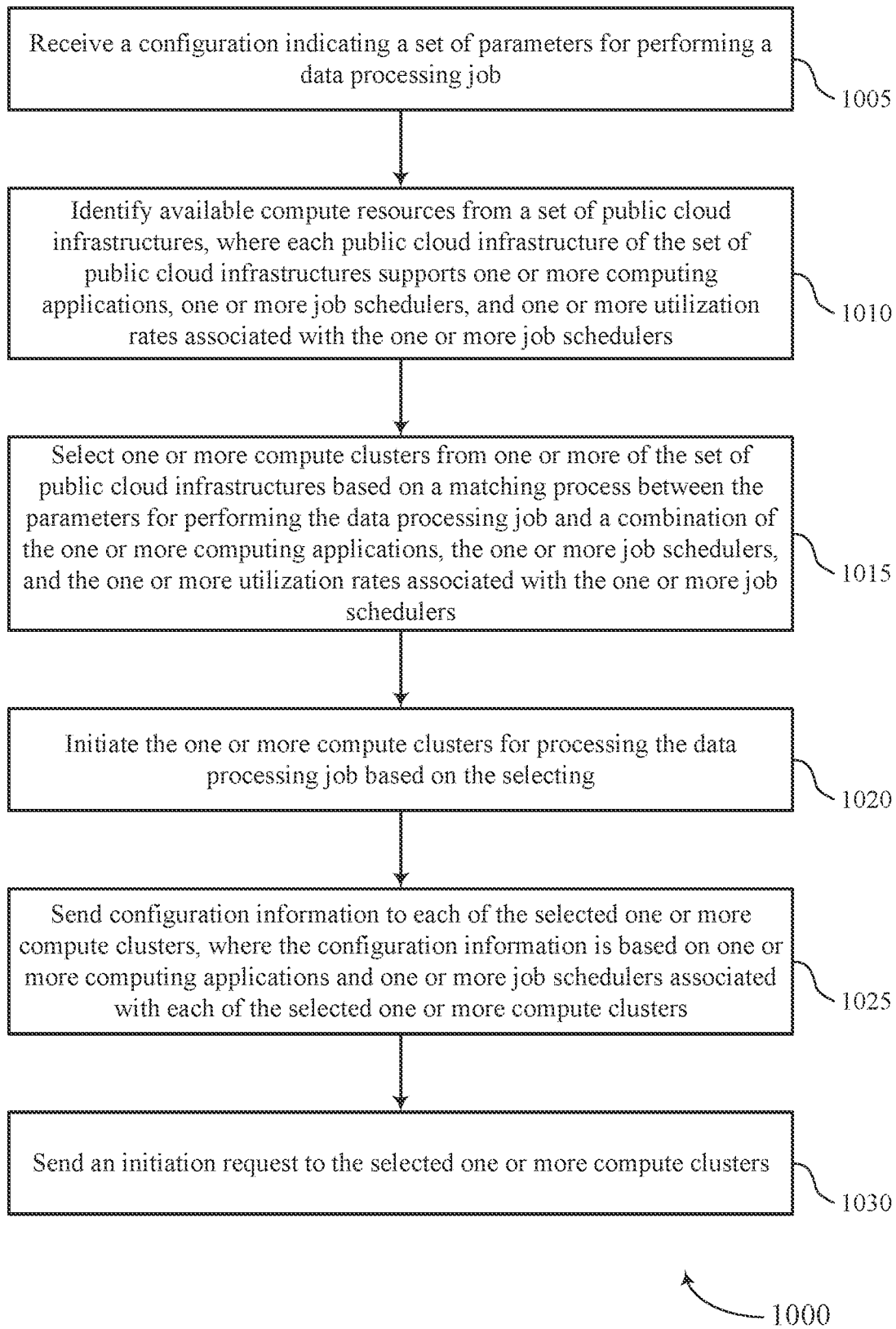

FIG. 10 shows a flowchart illustrating a method 1000 that supports multi substrate public cloud big data jobs as a service in accordance with aspects of the present disclosure. The operations of method 1000 may be implemented by an application server or its components as described herein. For example, the operations of method 1000 may be performed by a data processing controller as described with reference to FIGS. 5 through 7. In some examples, an application server may execute a set of instructions to control the functional elements of the application server to perform the functions described herein. Additionally or alternatively, an application server may perform aspects of the functions described herein using special-purpose hardware.

At 1005, the application server may receive a configuration indicating a set of parameters for performing a data processing job. The operations of 1005 may be performed according to the methods described herein. In some examples, aspects of the operations of 1005 may be performed by a configuration component as described with reference to FIGS. 5 through 7.

At 1010, the application server may identify available compute resources from a set of public cloud infrastructures, where each public cloud infrastructure of the set of public cloud infrastructures supports one or more computing applications, one or more job schedulers, and one or more utilization rates associated with the one or more job schedulers. The operations of 1010 may be performed according to the methods described herein. In some examples, aspects of the operations of 1010 may be performed by a resource identification component as described with reference to FIGS. 5 through 7.

At 1015, the application server may select one or more compute clusters from one or more of the set of public cloud infrastructures based on a matching process between the parameters for performing the data processing job and a combination of the one or more computing applications, the one or more job schedulers, and the one or more utilization rates associated with the one or more job schedulers. The operations of 1015 may be performed according to the methods described herein. In some examples, aspects of the operations of 1015 may be performed by a resource selection component as described with reference to FIGS. 5 through 7.

At 1020, the application server may initiate the one or more compute clusters for processing the data processing job based on the selecting. The operations of 1020 may be performed according to the methods described herein. In some examples, aspects of the operations of 1020 may be performed by a resource initiation component as described with reference to FIGS. 5 through 7.

At 1025, the application server may send configuration information to each of the selected one or more compute clusters, where the configuration information is based on one or more computing applications and one or more job schedulers associated with each of the selected one or more compute clusters. The operations of 1025 may be performed according to the methods described herein. In some examples, aspects of the operations of 1025 may be performed by a resource initiation component as described with reference to FIGS. 5 through 7.

At 1030, the application server may send an initiation request to the selected one or more compute clusters. The operations of 1030 may be performed according to the methods described herein. In some examples, aspects of the operations of 1030 may be performed by a resource initiation component as described with reference to FIGS. 5 through 7.

Figure 11:
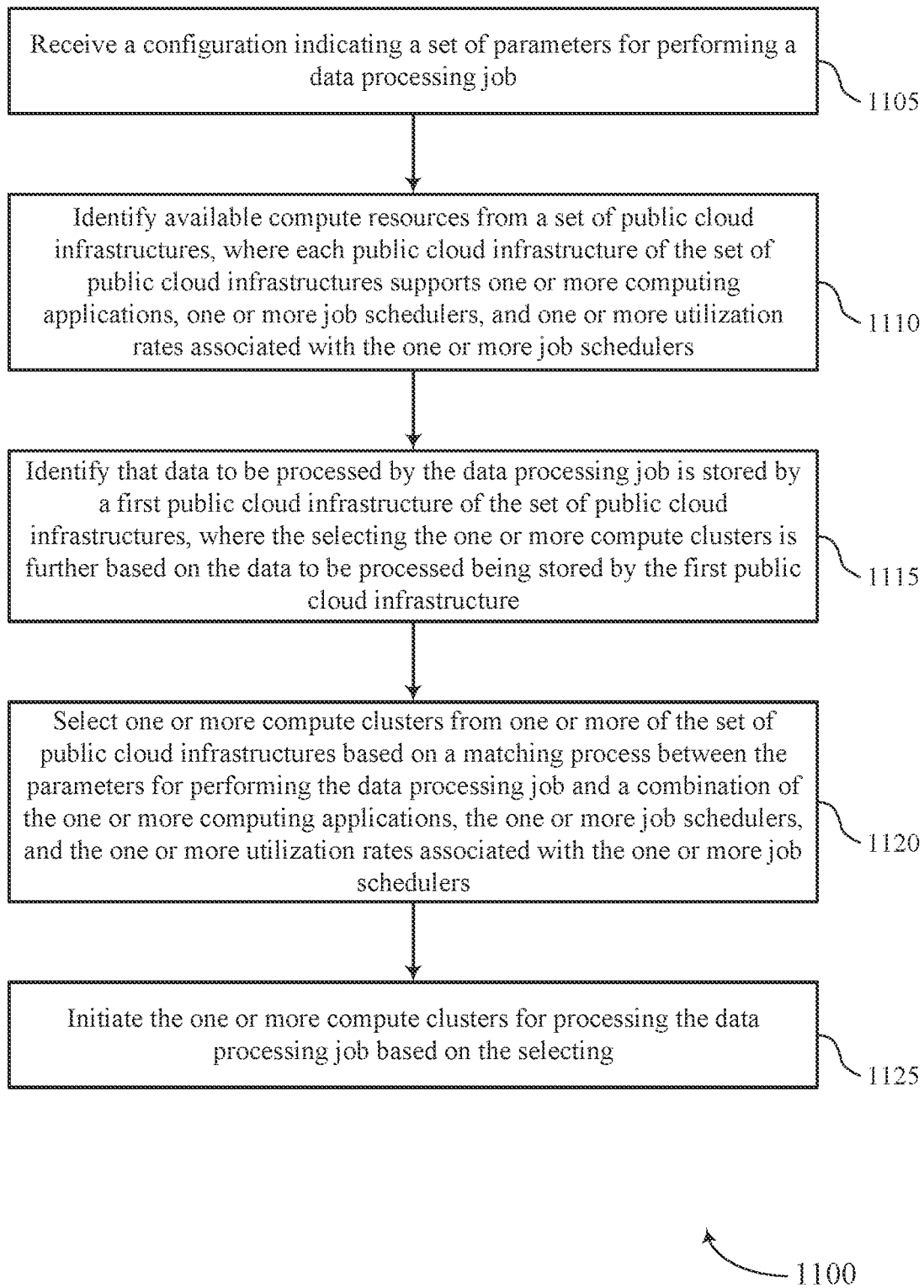

FIG. 11 shows a flowchart illustrating a method 1100 that supports multi substrate public cloud big data jobs as a service in accordance with aspects of the present disclosure. The operations of method 1100 may be implemented by an application server or its components as described herein. For example, the operations of method 1100 may be performed by a data processing controller as described with reference to FIGS. 5 through 7. In some examples, an application server may execute a set of instructions to control the functional elements of the application server to perform the functions described herein. Additionally or alternatively, an application server may perform aspects of the functions described herein using special-purpose hardware.

At 1105, the application server may receive a configuration indicating a set of parameters for performing a data processing job. The operations of 1105 may be performed according to the methods described herein. In some examples, aspects of the operations of 1105 may be performed by a configuration component as described with reference to FIGS. 5 through 7.

At 1110, the application server may identify available compute resources from a set of public cloud infrastructures, where each public cloud infrastructure of the set of public cloud infrastructures supports one or more computing applications, one or more job schedulers, and one or more utilization rates associated with the one or more job schedulers. The operations of 1110 may be performed according to the methods described herein. In some examples, aspects of the operations of 1110 may be performed by a resource identification component as described with reference to FIGS. 5 through 7.

At 1115, the application server may identify that data to be processed by the data processing job is stored by a first public cloud infrastructure of the set of public cloud infrastructures, where the selecting the one or more compute clusters is further based on the data to be processed being stored by the first public cloud infrastructure. The operations of 1115 may be performed according to the methods described herein. In some examples, aspects of the operations of 1115 may be performed by a data locator component as described with reference to FIGS. 5 through 7.

At 1120, the application server may select one or more compute clusters from one or more of the set of public cloud infrastructures based on a matching process between the parameters for performing the data processing job and a combination of the one or more computing applications, the one or more job schedulers, and the one or more utilization rates associated with the one or more job schedulers. The operations of 1120 may be performed according to the methods described herein. In some examples, aspects of the operations of 1120 may be performed by a resource selection component as described with reference to FIGS. 5 through 7.

At 1125, the application server may initiate the one or more compute clusters for processing the data processing job based on the selecting. The operations of 1125 may be performed according to the methods described herein. In some examples, aspects of the operations of 1125 may be performed by a resource initiation component as described with reference to FIGS. 5 through 7.

Figure 12:
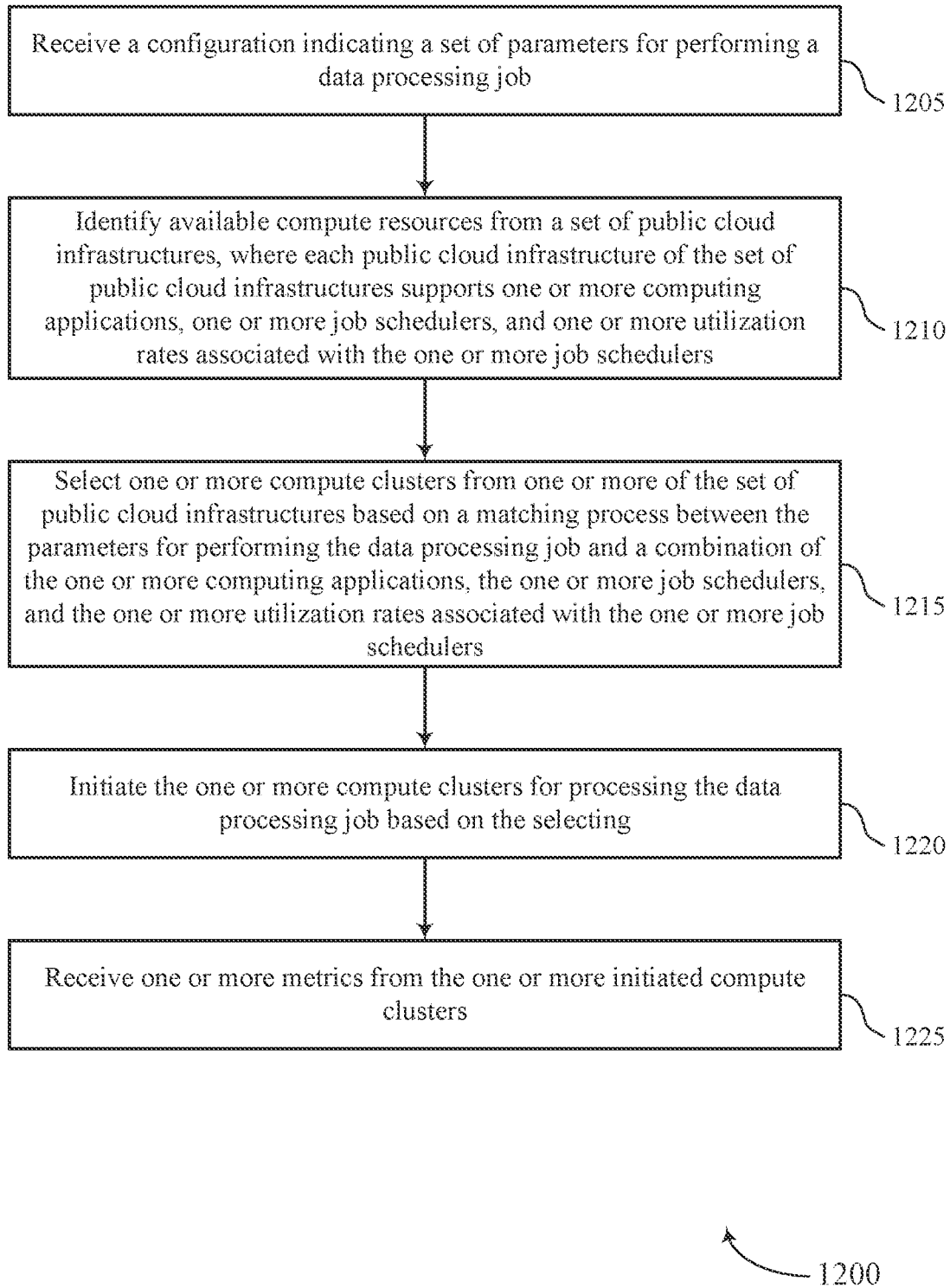

FIG. 12 shows a flowchart illustrating a method 1200 that supports multi substrate public cloud big data jobs as a service in accordance with aspects of the present disclosure. The operations of method 1200 may be implemented by an application server or its components as described herein. For example, the operations of method 1200 may be performed by a data processing controller as described with reference to FIGS. 5 through 7. In some examples, an application server may execute a set of instructions to control the functional elements of the application server to perform the functions described herein. Additionally or alternatively, an application server may perform aspects of the functions described herein using special-purpose hardware.

At 1205, the application server may receive a configuration indicating a set of parameters for performing a data processing job. The operations of 1205 may be performed according to the methods described herein. In some examples, aspects of the operations of 1205 may be performed by a configuration component as described with reference to FIGS. 5 through 7.

At 1210, the application server may identify available compute resources from a set of public cloud infrastructures, where each public cloud infrastructure of the set of public cloud infrastructures supports one or more computing applications, one or more job schedulers, and one or more utilization rates associated with the one or more job schedulers. The operations of 1210 may be performed according to the methods described herein. In some examples, aspects of the operations of 1210 may be performed by a resource identification component as described with reference to FIGS. 5 through 7.

At 1215, the application server may select one or more compute clusters from one or more of the set of public cloud infrastructures based on a matching process between the parameters for performing the data processing job and a combination of the one or more computing applications, the one or more job schedulers, and the one or more utilization rates associated with the one or more job schedulers. The operations of 1215 may be performed according to the methods described herein. In some examples, aspects of the operations of 1215 may be performed by a resource selection component as described with reference to FIGS. 5 through 7.

At 1220, the application server may initiate the one or more compute clusters for processing the data processing job based on the selecting. The operations of 1220 may be performed according to the methods described herein. In some examples, aspects of the operations of 1220 may be performed by a resource initiation component as described with reference to FIGS. 5 through 7.

At 1225, the application server may receive one or more metrics from the one or more initiated compute clusters. The operations of 1225 may be performed according to the methods described herein. In some examples, aspects of the operations of 1225 may be performed by a metrics component as described with reference to FIGS. 5 through 7.

A method of data processing at a database server is described. The method may include receiving a configuration indicating a set of parameters for performing a data processing job, identifying available compute resources from a set of public cloud infrastructures, where each public cloud infrastructure of the set of public cloud infrastructures supports one or more computing applications, one or more job schedulers, and one or more utilization rates associated with the one or more job schedulers, selecting one or more compute clusters from one or more of the set of public cloud infrastructures based on a matching process between the parameters for performing the data processing job and a combination of the one or more computing applications, the one or more job schedulers, and the one or more utilization rates associated with the one or more job schedulers, and initiating the one or more compute clusters for processing the data processing job based on the selecting.

An apparatus for data processing at a database server is described. The apparatus may include a processor, memory coupled with the processor, and instructions stored in the memory. The instructions may be executable by the processor to cause the apparatus to receive a configuration indicating a set of parameters for performing a data processing job, identify available compute resources from a set of public cloud infrastructures, where each public cloud infrastructure of the set of public cloud infrastructures supports one or more computing applications, one or more job schedulers, and one or more utilization rates associated with the one or more job schedulers, select one or more compute clusters from one or more of the set of public cloud infrastructures based on a matching process between the parameters for performing the data processing job and a combination of the one or more computing applications, the one or more job schedulers, and the one or more utilization rates associated with the one or more job schedulers, and initiate the one or more compute clusters for processing the data processing job based on the selecting.

Another apparatus for data processing at a database server is described. The apparatus may include means for receiving a configuration indicating a set of parameters for performing a data processing job, identifying available compute resources from a set of public cloud infrastructures, where each public cloud infrastructure of the set of public cloud infrastructures supports one or more computing applications, one or more job schedulers, and one or more utilization rates associated with the one or more job schedulers, selecting one or more compute clusters from one or more of the set of public cloud infrastructures based on a matching process between the parameters for performing the data processing job and a combination of the one or more computing applications, the one or more job schedulers, and the one or more utilization rates associated with the one or more job schedulers, and initiating the one or more compute clusters for processing the data processing job based on the selecting.

A non-transitory computer-readable medium storing code for data processing at a database server is described. The code may include instructions executable by a processor to receive a configuration indicating a set of parameters for performing a data processing job, identify available compute resources from a set of public cloud infrastructures, where each public cloud infrastructure of the set of public cloud infrastructures supports one or more computing applications, one or more job schedulers, and one or more utilization rates associated with the one or more job schedulers, select one or more compute clusters from one or more of the set of public cloud infrastructures based on a matching process between the parameters for performing the data processing job and a combination of the one or more computing applications, the one or more job schedulers, and the one or more utilization rates associated with the one or more job schedulers, and initiate the one or more compute clusters for processing the data processing job based on the selecting.

In some examples of the method, apparatuses, and non-transitory computer-readable medium described herein, identifying available compute resources from a set of public cloud infrastructures may include operations, features, means, or instructions for receiving one or more indications of real-time availability from the set of public cloud infrastructures, and receiving one or more indications of utilization rates from the set of public cloud infrastructures.

In some examples of the method, apparatuses, and non-transitory computer-readable medium described herein, initiating the one or more compute clusters for processing the data processing job may include operations, features, means, or instructions for sending configuration information to each of the selected one or more compute clusters, where the configuration information may be based on one or more computing applications and one or more job schedulers associated with each of the selected one or more compute clusters, and sending an initiation request to the selected one or more compute clusters.

Some examples of the method, apparatuses, and non-transitory computer-readable medium described herein may further include operations, features, means, or instructions for identifying that data to be processed by the data processing job may be stored by a first public cloud infrastructure of the set of public cloud infrastructures, where the selecting the one or more compute clusters may be further based on the data to be processed being stored by the first public cloud infrastructure.

Some examples of the method, apparatuses, and non-transitory computer-readable medium described herein may further include operations, features, means, or instructions for receiving one or more metrics from the one or more initiated compute clusters. Some examples of the method, apparatuses, and non-transitory computer-readable medium described herein may further include operations, features, means, or instructions for performing a scaling operation for the initiated one or more compute clusters based on the one or more metrics, where the scaling operation includes, selecting one or more additional compute clusters from one or more of the set of public cloud infrastructures based on the one or more metrics, and initiating the one or more additional compute clusters for processing the data processing job.

Some examples of the method, apparatuses, and non-transitory computer-readable medium described herein may further include operations, features, means, or instructions for performing a scaling operation for the initiated one or more compute clusters based on the one or more metrics, where the scaling operation includes, selecting one or more of the compute clusters to be terminated based on one or more of the metrics, and terminating the one or more compute clusters selected to be terminated.

In some examples of the method, apparatuses, and non-transitory computer-readable medium described herein, the parameters for performing the data processing job include a selection of an operating environment. In some examples of the method, apparatuses, and non-transitory computer-readable medium described herein, the operating environment may be a development environment. In some examples of the method, apparatuses, and non-transitory computer-readable medium described herein, the operating environment may be a production environment.

In some examples of the method, apparatuses, and non-transitory computer-readable medium described herein, the parameters for performing the data processing job include a designation of one or more acceptable utilization rates.

In some examples of the method, apparatuses, and non-transitory computer-readable medium described herein, the matching process includes one or more rules configured at the application server, the one or more rules defining weights for each of the set of parameters for performing the data processing job.

In some examples of the method, apparatuses, and non-transitory computer-readable medium described herein, each public cloud infrastructure of the set of public cloud infrastructures supports one or more instance families that define a resource optimization scheme, and the matching process includes a matching between the parameters for performing the data processing job and the one or more instance families.

In some examples of the method, apparatuses, and non-transitory computer-readable medium described herein, the resource optimization scheme optimizes the computation performance of at least one of the one or more compute clusters. In some examples of the method, apparatuses, and non-transitory computer-readable medium described herein, the resource optimization scheme optimizes the memory performance of at least one of the one or more compute clusters.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing at an application server, comprising:
   receiving a configuration indicating a plurality of parameters for performing a data processing job and a plurality of performance targets for performing the data processing job;
   identifying available compute resources from a plurality of public cloud infrastructures, wherein each public cloud infrastructure of the plurality of public cloud infrastructures supports one or more computing applications, one or more job schedulers, and one or more utilization rates associated with the one or more job schedulers;
   selecting one or more compute clusters from one or more of the plurality of public cloud infrastructures based at least in part on a matching process between the parameters for performing the data processing job and a combination of the one or more computing applications, the one or more job schedulers, and the one or more utilization rates associated with the one or more job schedulers, wherein the matching process comprises one or more rules configured at the application server, the one or more rules defining one or more weights for each of the plurality of parameters for performing the data processing job, the one or more weights associated with the plurality of performance targets and based at least in part on one or more locations, at one or more public cloud infrastructures of the plurality of public cloud infrastructures, of data to be processed by the data processing job, and wherein the one or more compute clusters are selected based at least in part on the weights and a prioritization of the plurality of performance targets, the prioritization based at least in part on the one or more weights; and
   initiating the one or more compute clusters for processing the data processing job based at least in part on the selecting.

2. The method of claim 1, wherein identifying available compute resources from a plurality of public cloud infrastructures comprises:
   receiving one or more indications of real-time availability from the plurality of public cloud infrastructures; and
   receiving one or more indications of utilization rates from the plurality of public cloud infrastructures.

3. The method of claim 1, wherein initiating the one or more compute clusters for processing the data processing job comprises:
   sending configuration information to each of the selected one or more compute clusters, wherein the configuration information is based at least in part on one or more computing applications and one or more job schedulers associated with each of the selected one or more compute clusters; and
   sending an initiation request to the selected one or more compute clusters.

4. The method of claim 1, further comprising:
   identifying that data to be processed by the data processing job is stored by a first public cloud infrastructure of the plurality of public cloud infrastructures, wherein the selecting the one or more compute clusters is further based at least in part on the data to be processed being stored by the first public cloud infrastructure.

5. The method of claim 1, further comprising:
   receiving one or more metrics from the one or more initiated compute clusters.

6. The method of claim 5, further comprising:
   performing a scaling operation for the initiated one or more compute clusters based at least in part on the one or more metrics, wherein the scaling operation comprises;
   selecting one or more additional compute clusters from one or more of the plurality of public cloud infrastructures based at least in part on the one or more metrics; and
   initiating the one or more additional compute clusters for processing the data processing job.

7. The method of claim 5, further comprising:
   performing a scaling operation for the initiated one or more compute clusters based at least in part on the one or more metrics, wherein the scaling operation comprises;
   selecting one or more of the compute clusters to be terminated based at least in part on one or more of the metrics; and
   terminating the one or more compute clusters selected to be terminated.

8. The method of claim 1, wherein the parameters for performing the data processing job comprise a selection of an operating environment.

9. The method of claim 8, wherein the operating environment is a development environment.

10. The method of claim 8, wherein the operating environment is a production environment.

11. The method of claim 1, wherein the parameters for performing the data processing job comprise a designation of one or more acceptable utilization rates.

12. The method of claim 1, wherein:
   each public cloud infrastructure of the plurality of public cloud infrastructures supports one or more instance families that define a resource optimization scheme; and the matching process comprises a matching between the parameters for performing the data processing job and the one or more instance families.

13. The method of claim 12, wherein the resource optimization scheme optimizes computation performance of at least one of the one or more compute clusters.

14. The method of claim 12 wherein the resource optimization scheme optimizes memory performance of at least one of the one or more compute clusters.

15. An apparatus for data processing at an application server, comprising:
a processor,
memory coupled with the processor; and
instructions stored in the memory and executable by the processor to cause the apparatus to:
receive a configuration indicating a plurality of parameters for performing a data processing job and a plurality of performance targets for performing the data processing job;
identify available compute resources from a plurality of public cloud infrastructures, wherein each public cloud infrastructure of the plurality of public cloud infrastructures supports one or more computing applications, one or more job schedulers, and one or more utilization rates associated with the one or more job schedulers;
select one or more compute clusters from one or more of the plurality of public cloud infrastructures based at least in part on a matching process between the parameters for performing the data processing job and a combination of the one or more computing applications, the one or more job schedulers, and the one or more utilization rates associated with the one or more job schedulers, wherein the matching process comprises one or more rules configured at the application server, the one or more rules defining one or more weights for each of the plurality of parameters for performing the data processing job, the one or more weights associated with the plurality of performance targets and based at least in part on one or more locations, at one or more public cloud infrastructures of the plurality of public cloud infrastructures, of data to be processed by the data processing job, and wherein the one or more compute clusters are selected based at least in part on the weights and a prioritization of the plurality of performance targets, the prioritization based at least in part on the one or more weights; and
initiate the one or more compute clusters for processing the data processing job based at least in part on the selecting.

16. The apparatus of claim 15, wherein the instructions to identify available compute resources from a plurality of public cloud infrastructures are executable by the processor to cause the apparatus to:
receive one or more indications of real-time availability from the plurality of public cloud infrastructures; and
receive one or more indications of utilization rates from the plurality of public cloud infrastructures.

17. The apparatus of claim 15, wherein the instructions to initiate the one or more compute clusters for processing the data processing job are executable by the processor to cause the apparatus to:
send configuration information to each of the selected one or more compute clusters, wherein the configuration information is based at least in part on one or more computing applications and one or more job schedulers associated with each of the selected one or more compute clusters; and
send an initiation request to the selected one or more compute clusters.

18. The apparatus of claim 15, wherein the instructions are further executable by the processor to cause the apparatus to:
receive one or more metrics from the one or more initiated compute clusters.

19. A non-transitory computer-readable medium storing code for data processing at an application server, the code comprising instructions executable by a processor to:
receive a configuration indicating a plurality of parameters for performing a data processing job and a plurality of performance targets for performing the data processing job;
identify available compute resources from a plurality of public cloud infrastructures, wherein each public cloud infrastructure of the plurality of public cloud infrastructures supports one or more computing applications, one or more job schedulers, and one or more utilization rates associated with the one or more job schedulers;
select one or more compute clusters from one or more of the plurality of public cloud infrastructures based at least in part on a matching process between the parameters for performing the data processing job and a combination of the one or more computing applications, the one or more job schedulers, and the one or more utilization rates associated with the one or more job schedulers, wherein the matching process comprises one or more rules configured at the application server, the one or more rules defining one or more weights for each of the plurality of parameters for performing the data processing job, the one or more weights associated with the plurality of performance targets and based at least in part on one or more locations, at one or more public cloud infrastructures of the plurality of public cloud infrastructures, of data to be processed by the data processing job, and wherein the one or more compute clusters are selected based at least in part on the weights and a prioritization of the plurality of performance targets, the prioritization based at least in part on the one or more weights; and
initiate the one or more compute clusters for processing the data processing job based at least in part on the selecting.

* * * * *